(12) United States Patent
Chaussinand et al.

(10) Patent No.: US 10,857,875 B2
(45) Date of Patent: Dec. 8, 2020

(54) METHOD FOR DETERMINING THE THERMODYNAMIC STATE OF THE FUEL IN A FUEL SYSTEM

(71) Applicant: Plastic Omnium Advanced Innovation and Research, Brussels (BE)

(72) Inventors: Antoine Chaussinand, Brussels (BE); Jules-Joseph Van Schaftingen, Wavre (BE); David Hill, Commerce Township, MI (US); Paul Daniel Reuther, Oxford, MI (US)

(73) Assignee: Plastic Omnium Advanced Innovation and Research, Brussels (BE)

( * ) Notice: Subject to any disclaimer, the term of this patent is extended or adjusted under 35 U.S.C. 154(b) by 51 days.

(21) Appl. No.: 16/220,052

(22) Filed: Dec. 14, 2018

(65) Prior Publication Data

US 2019/0184816 A1 Jun. 20, 2019

(30) Foreign Application Priority Data

Dec. 18, 2017 (EP) .................................... 17208255

(51) Int. Cl.
*B60K 15/035* (2006.01)
*G01N 7/14* (2006.01)
(Continued)

(52) U.S. Cl.
CPC ... *B60K 15/03504* (2013.01); *F02M 25/0809* (2013.01); *G01L 19/083* (2013.01);
(Continued)

(58) Field of Classification Search
CPC .............................................. B60K 15/03504
See application file for complete search history.

(56) References Cited

U.S. PATENT DOCUMENTS 6,213,102 B1 * 4/2001 Isobe ................. F02M 25/0809
 123/520
6,223,732 B1 * 5/2001 Isobe ................. F02M 25/0809
 123/520

(Continued)

FOREIGN PATENT DOCUMENTS

EP           2 666 997 A1     11/2013
WO         2014/200959       12/2014
WO     WO 2016/165821 A1    10/2016

OTHER PUBLICATIONS

European Search Report dated Sep. 17, 2018 in European application 17208255.4, filed on Dec. 18, 2017.

Primary Examiner — John M Zaleskas
(74) Attorney, Agent, or Firm — Oblon, McClelland, Maier & Neustadt, L.L.P.

(57) ABSTRACT

Determining the thermodynamic state of fuel includes opening the venting connection to release the tank pressure while monitoring the derivative pressure (dP/dt), closing the venting connection when one of the following conditions is met, the derivative pressure (dP/dt) is lower than a predetermined threshold DP1 or the opening time Δt1 reaches a predetermined value, if the closing of the venting connection occurs when the opening time Δt1 reaches the said predetermined value, determining that the fuel is boiling and aborting the method if the closing of the venting connection occurs when the derivative pressure (dP/dt) is lower than the said threshold DP1, measuring an initial tank pressure at the closing of the venting connection, measuring the final tank pressure after a closure time Δt2, calculating the pressure variation (ΔP/Δt2), comparing the pressure variation (ΔP/Δt2) with a first threshold PV1, if the pressure is lower then aborting the method.

16 Claims, 3 Drawing Sheets

(51) Int. Cl.
*G01L 19/08* (2006.01)
*F02M 25/08* (2006.01)
*B60K 15/03* (2006.01)

(52) U.S. Cl.
CPC ........ *G01N 7/14* (2013.01); *B60K 2015/0319* (2013.01); *B60K 2015/03561* (2013.01)

(56) References Cited

U.S. PATENT DOCUMENTS

| | | | | |
|---|---|---|---|---|
| 6,276,344 B1* | 8/2001 | Isobe | ................ | F02M 25/0809 123/519 |
| 6,382,017 B1* | 5/2002 | Majkowski | ........ | F02M 25/0809 73/114.39 |
| 6,405,718 B1* | 6/2002 | Yoshioka | ........... | F02M 25/0809 123/198 D |
| 6,523,398 B1* | 2/2003 | Hanai | ................ | F02M 25/0809 73/114.39 |
| 7,448,367 B1* | 11/2008 | Reddy | ............. | B60K 15/03519 123/519 |
| 8,371,272 B1 | 2/2013 | Martin et al. | | |
| 2001/0054415 A1* | 12/2001 | Hanai | ............ | F02M 25/0809 123/520 |
| 2002/0104516 A1* | 8/2002 | Kaiser | ................ | F02M 25/0809 123/520 |
| 2002/0116102 A1* | 8/2002 | Kaiser | ................ | F02M 25/0809 701/33.8 |
| 2002/0148354 A1* | 10/2002 | Amano | ............... | F02M 25/0854 96/112 |
| 2003/0110836 A1* | 6/2003 | Cho | ................... | F02M 25/0818 73/40.7 |
| 2003/0136182 A1* | 7/2003 | Streib | ................ | F02M 25/0809 73/49.2 |
| 2004/0064244 A1* | 4/2004 | Tsuyuki | ............. | F02M 25/0818 701/114 |
| 2004/0250604 A1* | 12/2004 | Watanabe | .......... | F02M 25/0809 73/49.2 |
| 2011/0284125 A1* | 11/2011 | Hagen | .................. | F02M 25/089 141/45 |
| 2011/0295482 A1* | 12/2011 | Pearce | ............... | F02M 25/0818 701/102 |
| 2012/0179354 A1* | 7/2012 | Hagen | .............. | B60K 15/03519 701/102 |
| 2013/0297178 A1 | 11/2013 | Hill et al. | | |
| 2013/0298643 A1* | 11/2013 | Gearhart | ............... | G01M 3/025 73/40.5 R |
| 2014/0297071 A1* | 10/2014 | Dudar | ............... | F02M 25/0809 701/22 |
| 2016/0115907 A1* | 4/2016 | Hagen | ............. | B60K 15/03519 137/544 |
| 2016/0265480 A1* | 9/2016 | Fukui | ............... | B60K 15/03504 |
| 2017/0022920 A1* | 1/2017 | Hill | ....... | F02D 33/003 |
| 2017/0226967 A1* | 8/2017 | Dudar | ............. | B60K 15/03504 |
| 2017/0241376 A1* | 8/2017 | Dudar | ............. | F02M 25/0809 |
| 2017/0292475 A1* | 10/2017 | Dudar | ................ | F02D 41/0037 |
| 2017/0350351 A1* | 12/2017 | Lucka | .................... | F04B 37/00 |
| 2018/0072152 A1* | 3/2018 | Dudar | .................... | B67B 7/145 |
| 2018/0072556 A1* | 3/2018 | Dudar | .................... | B67B 7/145 |
| 2018/0088603 A1* | 3/2018 | Groussard | ............ | F17C 13/002 |
| 2018/0099859 A1* | 4/2018 | Dudar | ............. | B60K 15/03504 |
| 2019/0001811 A1* | 1/2019 | Collet | ............. | B60K 15/03519 |
| 2020/0063697 A1* | 2/2020 | Maclennan | ........ | F02M 25/0809 |

* cited by examiner

METHOD FOR DETERMINING THE THERMODYNAMIC STATE OF THE FUEL IN A FUEL SYSTEM

BACKGROUND OF THE INVENTION

Field of the Invention

The invention relates to a method for determining the thermodynamic state of the fuel in a fuel system. Particularly, the invention relates to a method that can be used in a pressurized fuel system of a hybrid electric vehicle, which needs periodical leak detection.

DESCRIPTION OF THE RELATED ART

A fuel system may contain fuel vapor which is usually generated by fuel tank refueling and diurnal engine operations. Emission regulations require diagnostics of a vehicle's emission control system to ensure that no leak is present and the fuel vapor does not go to the atmosphere. Such leak detection is mandatory once per drive cycle (a drive cycle is from key-on to the next key-on of the vehicle and includes parking time of the vehicle) in some countries where the related regulations are more stringent.

Some existing methods for detecting leak in a fuel tank have been known. One relates to the use of Engine Off Natural Vacuum (EONV) when a vehicle is key-off. In particular, a fuel system may be isolated at an engine-off event. The pressure in such a fuel system will increase if the tank is heated further, for example with the residual heat of the combustion engine or of the fuel pump, as liquid fuel vaporizes. As a fuel tank cools down, a vacuum is generated therein as fuel vapors condense to liquid fuel. Vacuum generation is monitored and leaks identified based on expected vacuum development or expected rates of vacuum development.

However, in some vehicles, such as in plug-in hybrid electric vehicles (PHEV), engine run time is limited. In fact, these vehicles are designed to manage a predetermined distance in an all-electric mode, but have an internal combustion engine and associated liquid fuel tank on board to manage the times when the vehicle has exceeded its all-electric range. A fuel system used for a PHEV is always a pressurized fuel system which has greater risk of leak. Since a PHEV has the potential of running in an all-electric mode throughout the whole life of the vehicle, it is theoretically possible that its internal combustion engine will never run. Therefore, the leak detection method mentioned above designed for a fuel vehicle might not apply to a PHEV.

Some other solutions have been identified to deal with the absence of natural vacuum at engine off event such as adding of a vacuum pump which may be included in an evaporative leak check module (ELCM) which draws vacuum across a reference orifice to obtain a reference vacuum to which evacuated fuel tank vacuum is compared.

Nevertheless, these solutions are prone to error when a fuel with a high Reid Vapor Pressure (RVP) is present in the fuel system. For example, for an ELCM test, the fuel vapor of a high RVP fuel may counteract the vacuum pull of the ELCM pump, causing a false failure during the ELCM test. Moreover, such a pump is able to induce a vacuum or pressure on request, but at the cost of additional energy consumption and a significant number of extra components.

BRIEF SUMMARY OF THE INVENTION

An objective of the invention is to overcome the inconveniences of the existing solutions as described above and to provide a method of determining if a leak detection in a fuel system should be carried out. Another objective of the invention is to provide a method for determining whether there is leak present in a pressurized fuel system at reduced consumption and cost but with improved accuracy when a vehicle is key-off.

To this end, according to an aspect of the invention, it is provided a method for determining the thermodynamic state of the fuel in a fuel system mounted on board of a vehicle comprising a pressurized fuel tank and a closable venting connection between the tank and the atmosphere, the method comprising the following steps:

a) opening the venting connection to release the tank pressure for an opening time $\Delta t1$ while monitoring the derivative pressure $(dP/dt)$;

b) closing the venting connection when one of the following conditions is met: the derivative pressure $(dP/dt)$ is lower than a predetermined threshold DP1 or the opening time $\Delta t1$ reaches a predetermined value;

c) if the closing of the venting connection occurs when the opening time $\Delta t1$ reaches the said predetermined value, determining that the fuel is boiling and aborting the method;

d) if the closing of the venting connection occurs when the derivative pressure $(dP/dt)$ is lower than the said threshold DP1, measuring an initial tank pressure at the closing of the venting connection, measuring the final tank pressure after a closure time $\Delta t2$, calculating the pressure variation $(\Delta P/\Delta t2)$;

e) comparing the pressure variation $(\Delta P/\Delta t2)$ with a first threshold PV1.

f) if the pressure variation $(\Delta P/\Delta t2)$ is lower than the first threshold PV1, determining that the fuel is not boiling and aborting the method.

The thermodynamic state of the fuel means that the fuel is boiling or not. In other words, when the fuel is boiling, the fuel volatility is defined by a high RVP, for example higher than 69 kPa (10 psi), the pressure increase following the venting connection closing is important and quick. In such a case the vapor pressure equilibrium is far to the saturation pressure level at the venting line closing and the leak detection test cannot be accurate; when the fuel is not boiling, the fuel volatility is defined by a low RVP, for example lower than 69 kPa (10 psi), then the pressure slope is reduced and the saturation pressure level is close to the equilibrium at the venting line closing which means the leak detection test can be carried out and the result will be more accurate.

Said derivative pressure corresponds to the instantaneous pressure variation in the fuel tank. Step b) is carried out until the measured derivative pressure $(dP/dt)$ is lower than a predetermined threshold DP1, preferably lower than 100 Pa/s; If the measured derivative pressure is always higher than the threshold DP1 when the opening time $\Delta t1$ reaches a predetermined value, for example 5s, the venting connection is closed at this time. It's a preliminary step of the determination of the thermodynamic state of the fuel in a fuel tank because if the derivative pressure fails to go down under the threshold DP1 it can be already deduced that the fuel is boiling and the next determination step does not need to be carried out.

If during the preliminary step the thermodynamic state of the fuel cannot be determined, which means that the measured derivative pressure is lower than the threshold DP1 when the opening time $\Delta t1$ reaches the predetermined value, other determination steps d), e), and f) should be carried out. In practice, in order to determinate the thermodynamic state of the fuel, the value of the pressure variation ($\Delta P/\Delta t2$) is compared to a first threshold PV1, for example 250 Pa/s. If the measured pressure variation is below the threshold, the fuel is not boiling; if the measured pressure variation is above the threshold, the fuel is boiling.

This method can be easily applied to a pressurized fuel system without any additional part. The leak detection test is carried out only when the fuel is identified as "not boiling" which lower energy consumption of the vehicle and statistically makes the leak detection test more accurate.

The method for determining the thermodynamic state of the fuel in a fuel system may further comprise one or more of the following features, taken alone or in combination:

In one alternative, after step e), if the pressure variation ($\Delta P/\Delta t2$) is higher than the first threshold PV1, determining that the fuel is boiling and aborting the method. Thus PV1 is the only threshold to determinate the state of the fuel and no other test is needed. It is a simple way the quickly determine that the fuel is not boiling.

In another alternative, after step e), if the pressure variation ($\Delta P/\Delta t2$) is higher than the first threshold PV1, the method further comprises steps as follows:

g) comparing the pressure variation ($\Delta P/\Delta t2$) with a second threshold PV2;

h) if the pressure variation ($\Delta P/\Delta t2$) is higher than the second threshold PV2, determining that the fuel is boiling and aborting the method;

i) if the pressure variation (($\Delta P/\Delta t2$) is lower than the second threshold PV2, repeating steps a), b), c) and d) a number of time N, analyzing the pressure variation ($\Delta P/\Delta t2$) after each repetition and determining if the fuel is boiling.

In this alternative, two threshold PV1 and PV2 are used in order to determine the state of the fuel in a very accurate way. Actually, when the pressure variation ($\Delta P/\Delta t2$) is found between the two thresholds, an uncertainty is present in the determination of the thermodynamic state of the fuel and step i) of repetition can be carried out for better observing the behavior of the fuel and for deducting its thermodynamic state in a more reliable way.

The number of time N is a predetermined number, for example 5. A repeatability of the test will show a downturn of the pressure increase in case of standard volatility which improve the detection. If the pressure variation $\Delta P/\Delta t$ remains constant from one measurement to another, it can be known that there are almost no volatile compounds in the fuel and the test can be stopped. The number of repetition can be changed in function of different parameters inside and/or outside the fuel tank.

The number of time N is calculated according to the first two pressure variations ($\Delta P/\Delta t2$). For example, if the first two pressure variation are both higher than a second threshold PV2, for example 800 Pa/s, it can be inferred that the fuel is boiling, and the test can be stopped. In this case, the number of time N is 2.

In step d), the measuring of the final tank pressure is taken out when one of the following conditions is met: the tank pressure reaches a predetermined value P1, for example 5000 Pa or the closing time $\Delta t2$ reaches predetermined value, for example 300 s. Following the measure of the final tank pressure, the pressure variation ($\Delta P/\Delta t2$) can be calculated. This solution can make the determination procedure faster because there is no need to wait during a fixed time which makes the electronic central unit more economical in terms of energy consumption.

The predetermined threshold DP1 is between 5 Pa/s and 50 Pa/s, preferably 10 Pa/s.

The predetermined value for the opening time $\Delta t1$ is between 2 s and 10 s, preferably 5 s. The pressure variation is measured during the opening of the venting connection and the venting connection is closed after the fixed time even the internal tank pressure is not stabilized yet. If, indeed, the pressure is not stabilized after the fixed opening time $\Delta t1$, it can be inferred that the fuel is boiling which means that the thermodynamic state of the fuel is determined and no leak detection test need to be done. This solution makes the electronic central unit even more economical in terms of energy consumption.

According to another aspect of the invention, it is provided a method for determining a leak present in a fuel system comprising the following steps:

j) carrying out the method for determining the thermodynamic state of the fuel in the fuel system according to one or more of the above discussed method, k) carrying out a diagnostic for the presence of leaks in the fuel system only if the fuel is not boiling.

A diagnostic for the presence of leaks in the fuel system is more accurate when the fuel is not boiling. This method makes the diagnostic more efficient with less measurement error and at lower energy cost.

The method for determining a leak present in a fuel system may further comprise one or more of the following features, taken alone or in combination:

The method is carried out when the vehicle is key-off since at least two hours so that no residual heat of the engine will disturb the measurements.

The method begins only if the relative internal tank pressure is between 1500 Pa and 10000 Pa. If the relative internal tank pressure is higher than the threshold, the thermodynamic state of the fuel does not need to be determined. Actually, in this case we can already be sure that no leak is present in the fuel system. This preliminary step tells whether the following steps should be carried out which makes the electronical central unit more economical in terms of energy consumption. If the relative internal tank pressure is below 1500 Pa, it is unlikely that the fuel is boiling and the leak determination method can be started directly.

The method begins only if the internal tank temperature is below a threshold T1, for example 29° C. Actually, under the threshold value, it is already known that the system cannot be boiling at standard atmospheric pressure.

BRIEF DESCRIPTION OF THE SEVERAL VIEWS OF THE DRAWINGS

The accompanying drawings are used to illustrate presently preferred non-limiting exemplary embodiments of the present invention. The above and other advantages of the features and objects of the invention will become more apparent and the invention will be better understood from the following detailed description when read in connection with the accompanying drawings, in which.

DETAILED DESCRIPTION OF THE INVENTION

Figure 1:
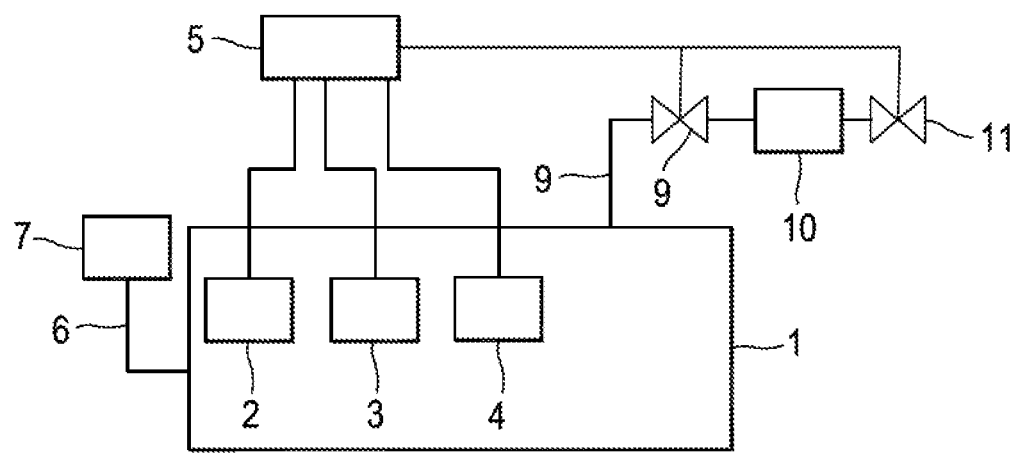
FIG. 1 is a schematic view of a fuel tank connected to an inlet duct, an electronic control unit and an outlet duct.

FIG. 1 illustrates a fuel tank 1 containing an amount of fuel and different sensors such as a volume sensor 2, a temperature sensor 3 and a pressure sensor 4. The volume sensor 2 and the temperature sensor 3 are connected to an electronical control unit (ECU) 5 which is placed outside the tank. The tank 1 comprises a filling duct 6 presenting a fuel inlet opening 7 and a discharging duct 8 in which are arranged a first valve 9 which is a closable venting connection between the tank and the atmosphere, a canister 10 configured to absorb impurities in the fuel vapor and prevent their release to the atmosphere and a second valve 11. The pressure sensor 4 is also connected to the electronical control unit which commands the opening and the closing of the first valve 9 and the second valve 11.

Figure 3:
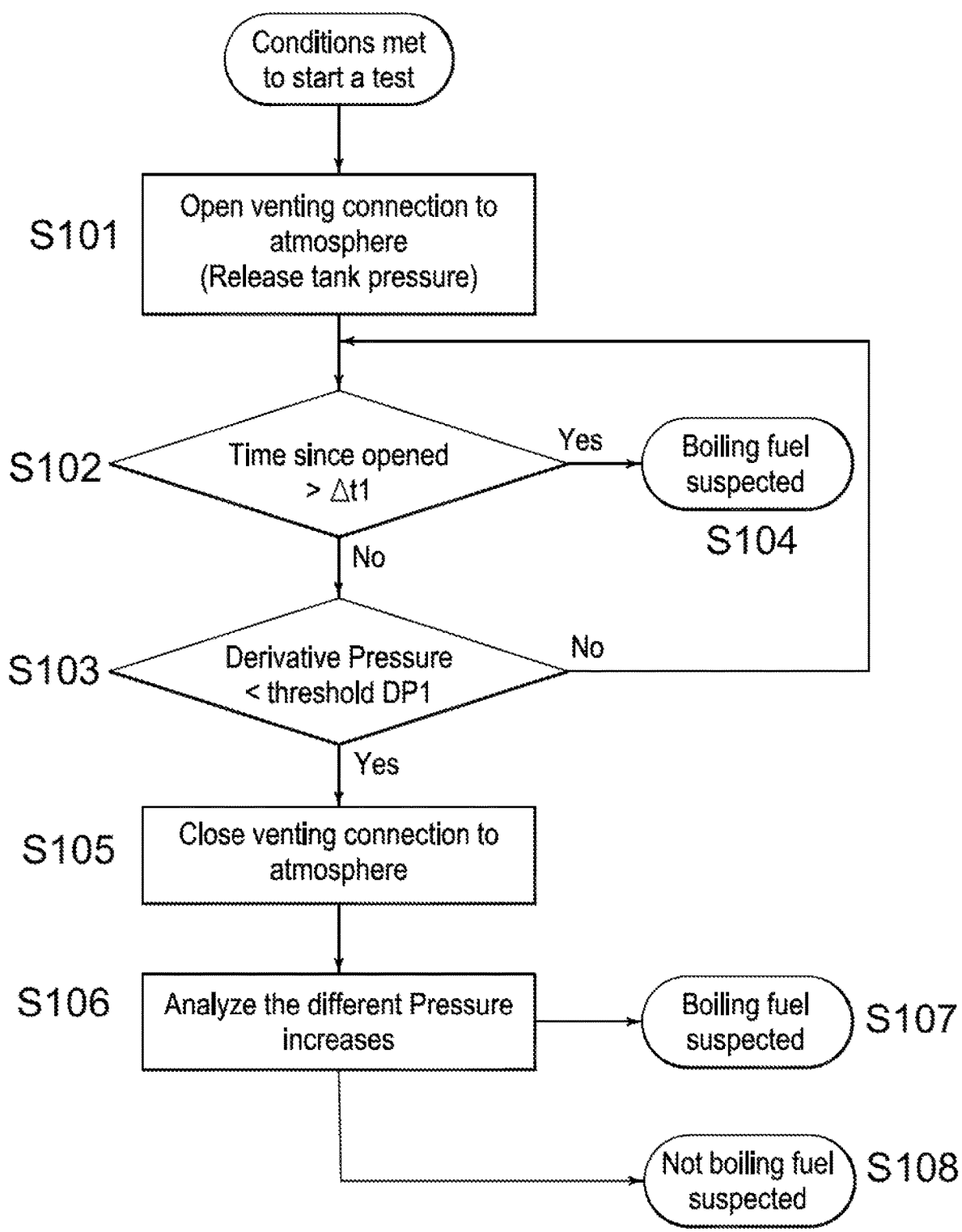
FIG. 3 is an algorithm schema showing an embodiment of the determination method.

Referring to a first embodiment of the determination method as illustrated in the algorithm schema in FIG. 3, before starting a fuel leak detection, several conditions should be met in order to obtain more accurate measurements and avoid unnecessary energy cost. These conditions could be: the key-off time of the vehicle, the relative internal tank pressure and/or the internal tank temperature, etc. Once the conditions are met, the venting connection to atmosphere which is originally closed is opened to release the tank pressure during an opening time Δt1 at S101.

The derivative pressure and the passed opening time are monitored. Two possibilities may occur: if the derivative pressure is always higher than a threshold DP1 (S103=No) even when the passed opening time reaches the predetermined value (S102=Yes, it means that the fuel is boiling (S104) and the leak detection does not need to be done after the closing of the venting connection. If, within the predetermined time frame, the derivative pressure falls below a threshold DP1 (S03=Yes), the venting connection is closed (S105) and it can be known that the thermostatic state of the fuel may meet the conditions for a leak detection test. In this case, an initial tank pressure is measured at the closing of the venting connection. After a predetermined closure time Δt2, the final tank pressure is also measured for calculating the pressure variation (ΔP/Δt2).

Figure 2:
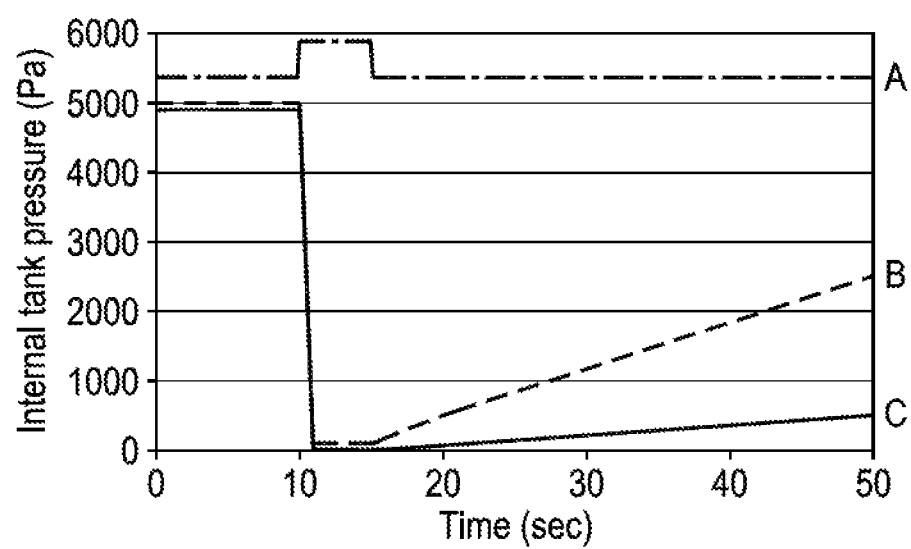
FIG. 2 is a graph showing an example of pressure increase after the first pressure release.

In an analysis step (S106) the pressure variation (ΔP/Δt2) is compared to a first threshold PV1. If the pressure variation (ΔP/Δt2) is higher than the first threshold PV1, the fuel is determined to be boiling (S107), and if the pressure variation (ΔP/Δt2) is lower than the first threshold PV1, the fuel is determined to be not boiling (S108) which means that the fuel is in a good condition for a leak detection. The FIG. 2 shows an example of two possibilities of pressure increase after the first pressure release: the curve A shows the position of the venting connection (closed/open), the curve B shows the pressure variation of a boiling fuel and the curve C shows the pressure variation of a fuel which is not boiling.

Figure 4:
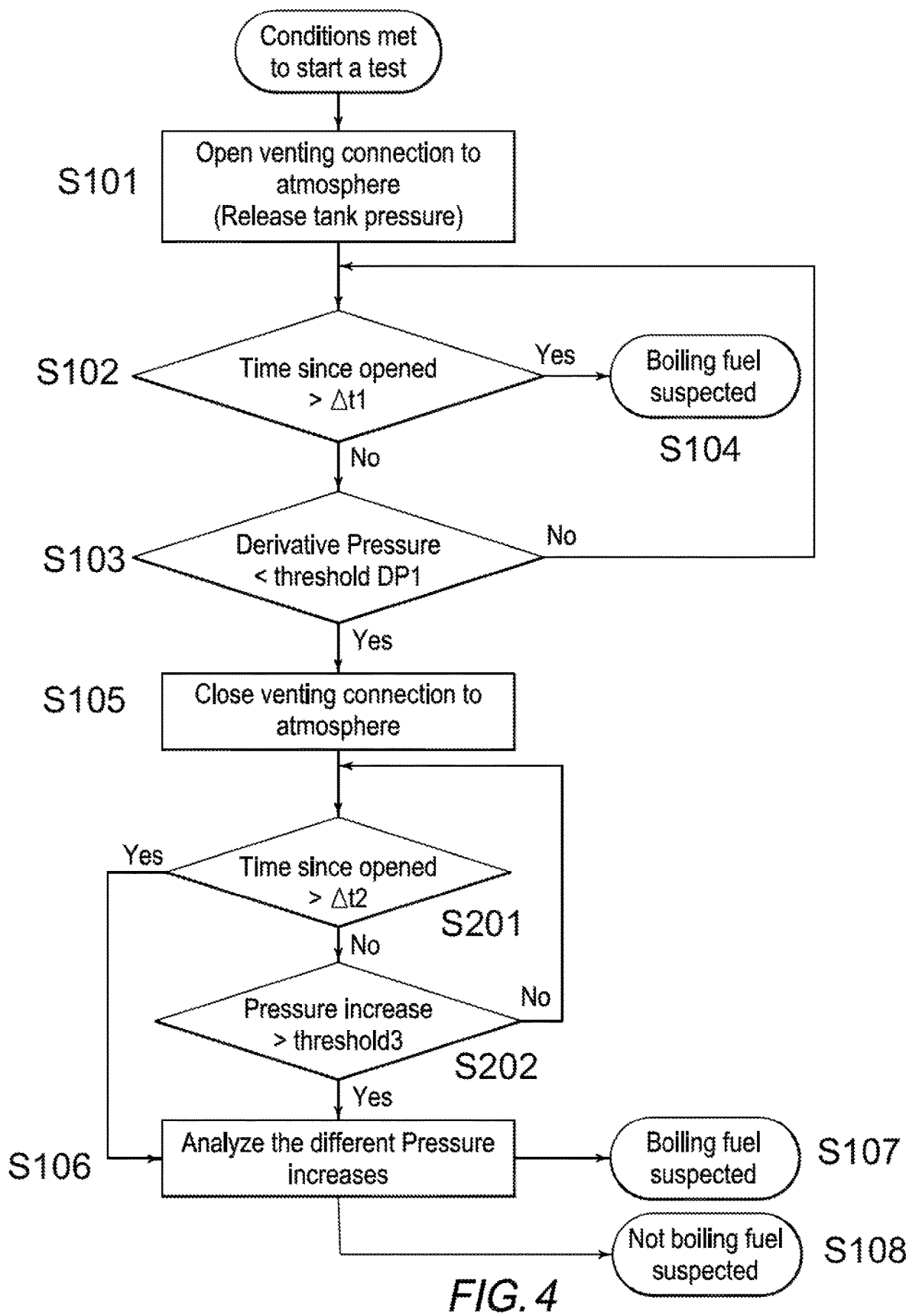
FIG. 4 is an algorithm schema showing another embodiment of the determination method.

Now referring to a second embodiment of the determination method as illustrated in the algorithm schema in FIG. 4, the method is identical to the first embodiment until the step of closing of the venting connection after the first pressure release. The particularity of this embodiment is that no predetermined closure time is disposal and the measuring of the final tank pressure is taken out when one of the following conditions is met: the tank pressure reaches a predetermined value P1 (S202) or the closing time Δt2 reaches predetermined value (S201). Even though two different fuels cannot be compared anymore together in a schema as illustrated in FIG. 2 (since the closing time may change from one fuel to another), the pressure variation of each fuel can still be calculated based on the initial pressure, final pressure and measured closing time. This value is then compared to the first threshold PV1 as in the preceding embodiment to determine the thermostatic state of the fuel.

When the first measured pressure variation is higher than the first threshold PV1 but lower than a second threshold PV2, a repetition of opening-closing of the venting connection can be considered in order to observe the pressure variation of each repeated process and thus to determine whether the fuel is boiling.

The tableau below shows a comparison between two fuels 1 and 2. A predetermined value P1 has been set to 5000 Pa and for each repetition the venting connection is closed only when the internal tank pressure reaches this value. For the fuel 1, the time to reach the value P1 is 1 second at the $1^{st}$ time of repetition, 2 seconds at the $2^{nd}$ time of repetition and 2 seconds at the $3^{rd}$ time of repetition. It can be observed that the pressure increases very quickly to reach the predetermined value. It's easy to infer that the fuel is boiling and the test can be stopped. This method is very reliable because the result corresponds to the RVP of the fuel 1 which is 90 kPa (13 psi). This value is higher than 69 kPa (10 psi) and the fuel is considered to be boiling according to the definition at the beginning of this application.

|  | RVP (kPa) | Fuel Liter | Pinit before test (Pa) | Canister load (g) | time to increase of 5000 Pa(sec) | | |
|---|---|---|---|---|---|---|---|
|  |  |  |  |  | 1st time | $2^{nd}$ time | 3rd time |
| Fuel 1 | 90 | 27 | 119 | 74 | 1 | 2 | 2 |
| Fuel 2 | 55 | 27 | 16 | 11 | 60 | 286 | 413 |

Concerning the fuel 2, the same predetermined value of pressure P1 has been set and the time to reach this value P1 is much longer at each repetition (60 s for the 1st time, 286 s for the 2nd time and 413 s for the 3rd time). It shows that there are almost no volatile compounds in the fuel 2 and it's not boiling. This observation is also confirmed by the RVP of the fuel 2 which is 55 kPa (8.3 psi) (i.e. less than 10 psi or 69 kPa).

A method for determining a leak present in a fuel system (not shown) is also improved with a preliminary step of carrying out the method for determining the thermodynamic state of the fuel in the fuel system as described above. Therefore, the diagnostic as mentioned above or another diagnostic which is described in the European application N° 17305638.3 for the presence of leaks in the fuel system is started only if the fuel is not boiling which allows obtaining more accurate results and avoiding unnecessary energy consumption.

The invention claimed is:

1. A method for determining a thermodynamic state of a fuel in a fuel system mounted on board of a vehicle comprising a pressurized fuel tank and a closable venting connection between the pressurized fuel tank and the atmosphere, the method comprising:
    opening the venting connection to release a tank pressure for an opening time Δt1 while monitoring a derivative pressure (dP/dt);
    determining whether the derivative pressure is lower than a predetermined threshold DP1;

closing the venting connection when the derivative pressure (dP/dt) is lower than the predetermined threshold DP1;

closing the venting connection when the opening time Δt1 reaches a predetermined value and the derivative pressure (dP/dt) is greater than the predetermined threshold DP1;

determining that the fuel is boiling when the closing of the venting connection occurs when the opening time Δt1 reaches the predetermined value, and the derivative pressure (dP/dt) is greater than the predetermined threshold DP1;

measuring an initial tank pressure at the closing of the venting connection, measuring a final tank pressure after a closure time Δt2, and calculating a pressure variation (ΔP/Δt2) when the closing of the venting connection occurs when the derivative pressure (dP/dt) is lower than the said predetermined threshold DP1 and the opening time Δt1 does not reach the predetermined value;

comparing the pressure variation (ΔP/Δt2) with a first threshold PV1;

determining that the fuel is boiling when the pressure variation (ΔP/Δt2) is higher than the first threshold PV1; and determining that the fuel is not boiling when the pressure variation (ΔP/Δt2) is lower than the first threshold PV1.

2. The method according to claim 1, wherein when the pressure variation (ΔP/Δt2) is higher than the first threshold PV1, the method further comprises:

comparing the pressure variation (ΔP/Δt2) with a second threshold PV2;

determining that the fuel is boiling when the pressure variation (ΔP/Δt2) is higher than the second threshold PV2; and repeating, for a number of times N, the opening the venting connection, closing the venting connection when the derivative pressure (dP/dt) is greater than the predetermined threshold DP1, measuring an initial tank pressure at the closing of the venting connection, measuring a final tank pressure after a closure time Δt2, and calculating a pressure variation (ΔP/Δt2), comparing the pressure variation (ΔP/Δt2) with a first threshold PV1, and analyzing the pressure variation (ΔP/Δt2) after each repetition and determining if the fuel is boiling, when the pressure variation (ΔP/Δt2) is lower than the second threshold PV2.

3. The method according to claim 2, wherein the number of times N is a predetermined number.

4. The method according to claim 2, wherein the number of times N is calculated according to first two calculations of the pressure variation (ΔP/Δt2).

5. The method according to claim 2, wherein the number of times N is 5.

6. The method according to claim 1, wherein the measuring of the final tank pressure is carried out when one of the following conditions is met: the tank pressure reaches a predetermined value P1 or the closure time Δt2 reaches a predetermined value.

7. The method according to claim 1, wherein the predetermined threshold DP1 is between 5 Pa/s.

8. The method according to claim 1, wherein the predetermined value for the opening time Δt1 is between 2 s and 10.

9. The method according to claim 1, wherein the first threshold PV1 is 25 Pa/s.

10. The method according to claim 1, wherein the predetermined threshold DP1 is 10 Pa/s.

11. The method according to claim 1, wherein the predetermined value for the opening time Δt1 is 5 s.

12. A method for determining a leak present in a fuel system comprising:

carrying out the method for determining the thermodynamic state of the fuel in the fuel system according to claim 1, and carrying out a diagnostic for the presence of leaks in the fuel system only when the fuel is not boiling.

13. The method according to claim 12, wherein the method for determining a leak present in a fuel system is carried out when the vehicle is key-off for at least two hours.

14. The method according to claim 12, wherein the method for determining a leak present in a fuel system begins when a relative internal tank pressure is between 1500 Pa and 10000 Pa.

15. The method according to claim 12, wherein the method for determining a leak present in a fuel system begins when an internal tank temperature is below a threshold T1.

16. The method according to claim 12, wherein the method for determining a leak present in a fuel system begins when the internal tank temperature is below 29° C.

* * * * *